Fig_3
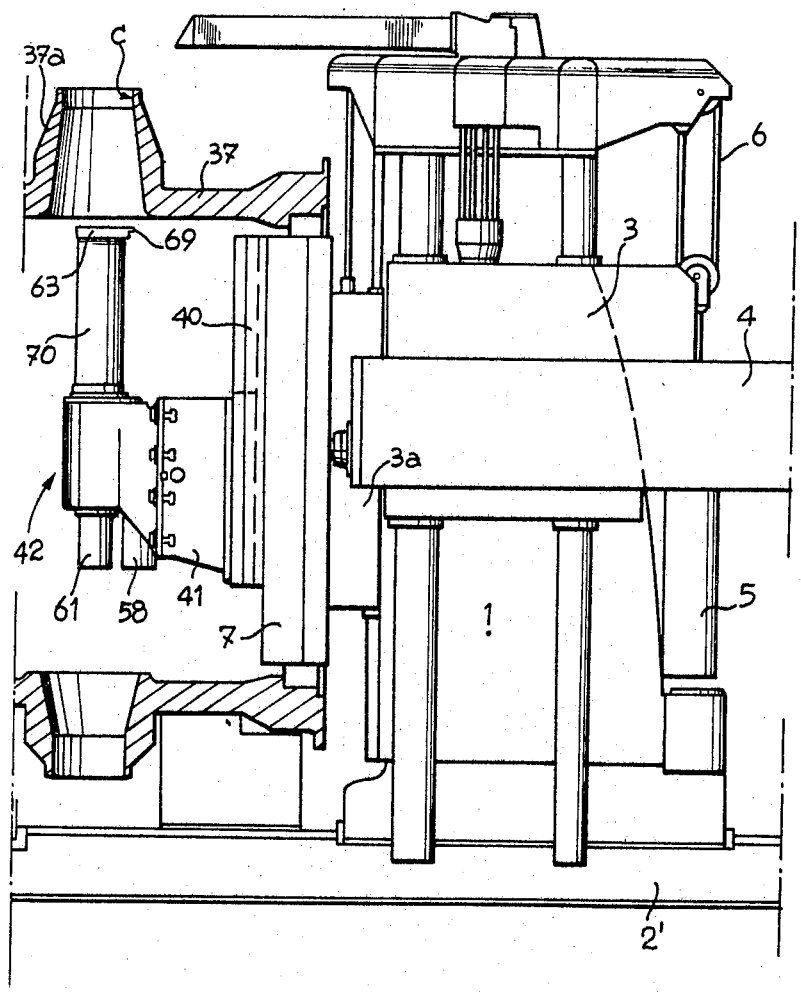

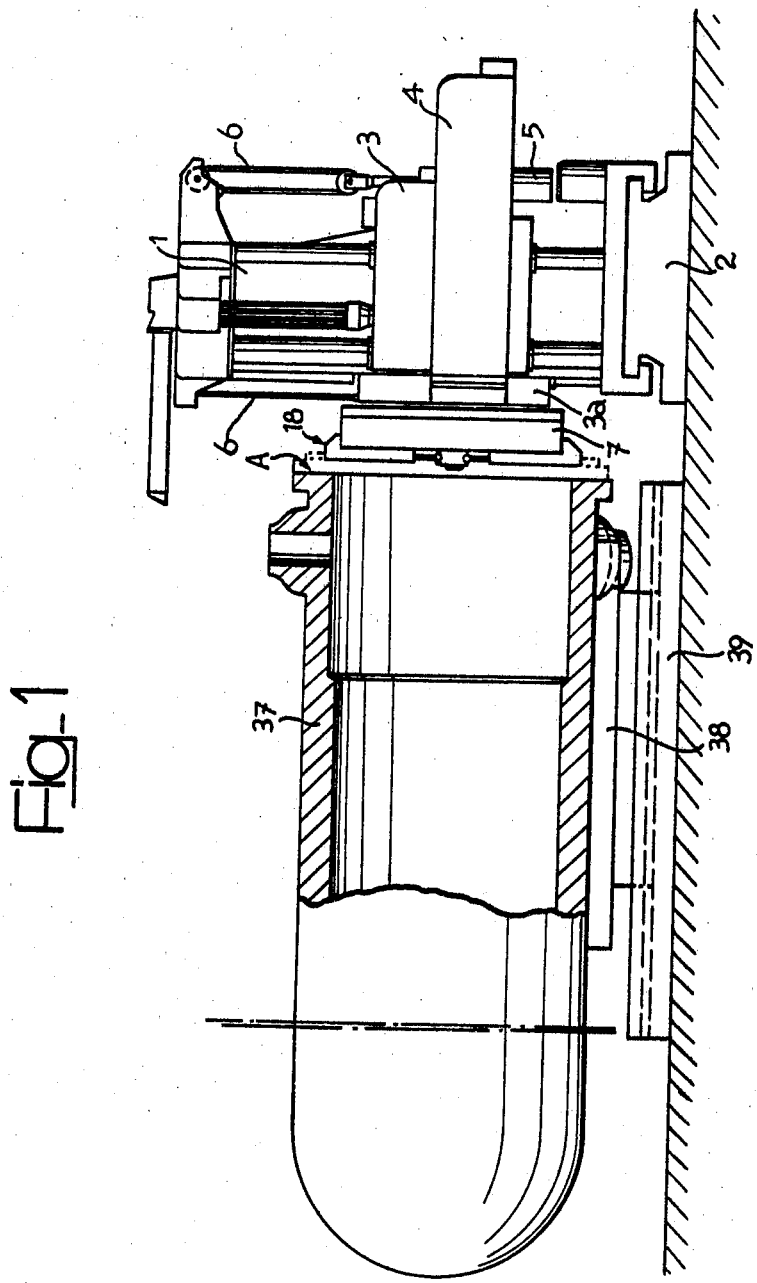

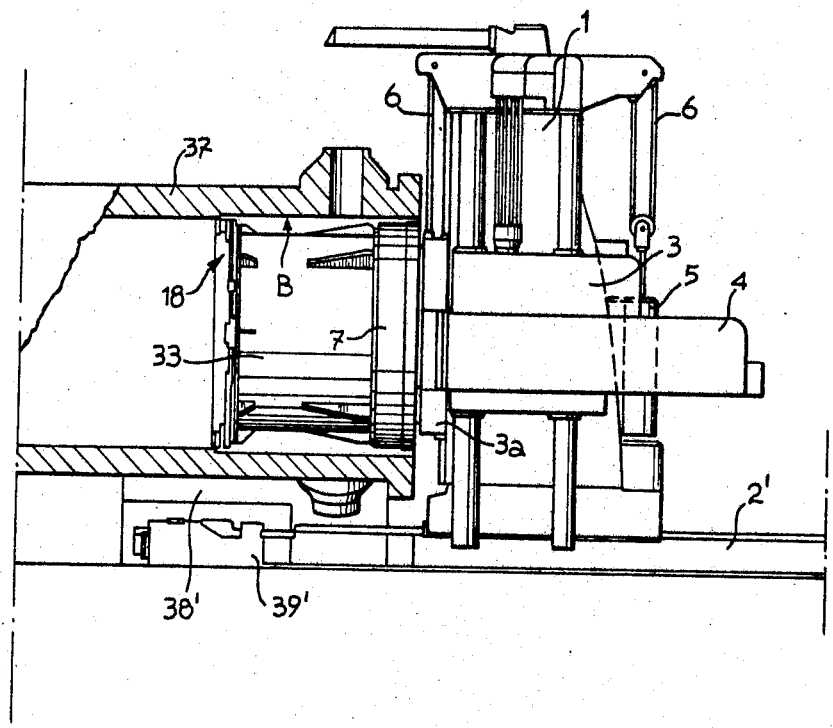

Fig_4
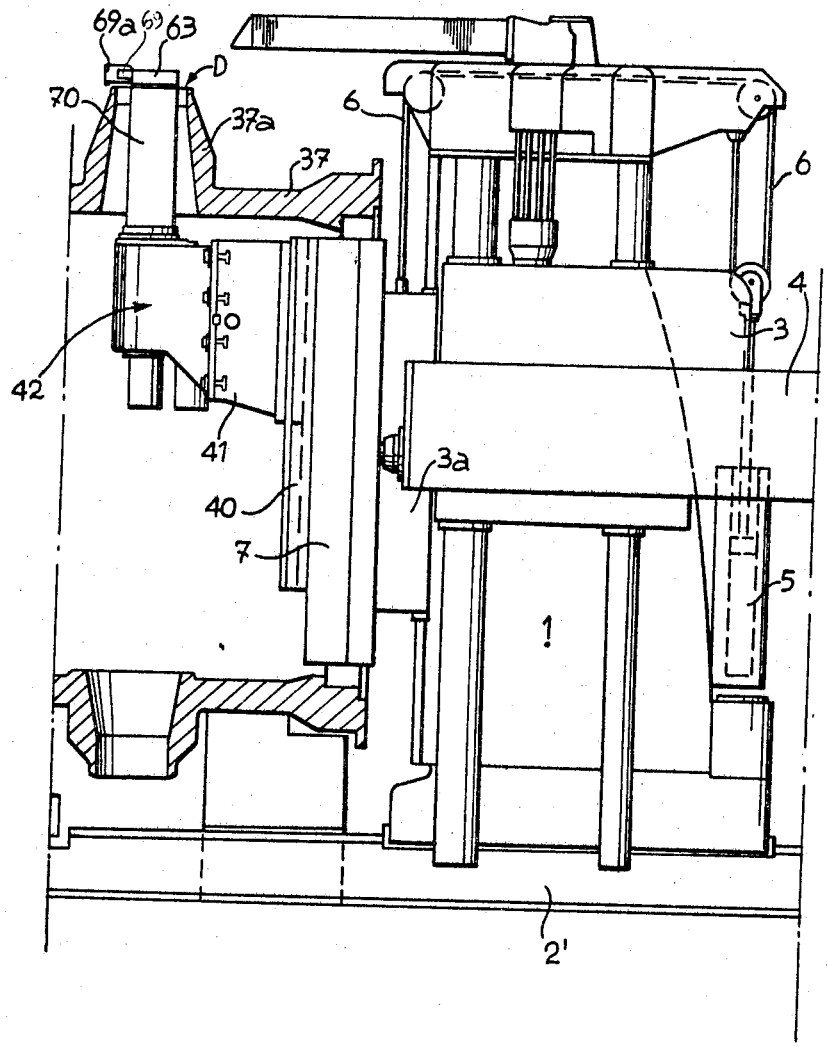

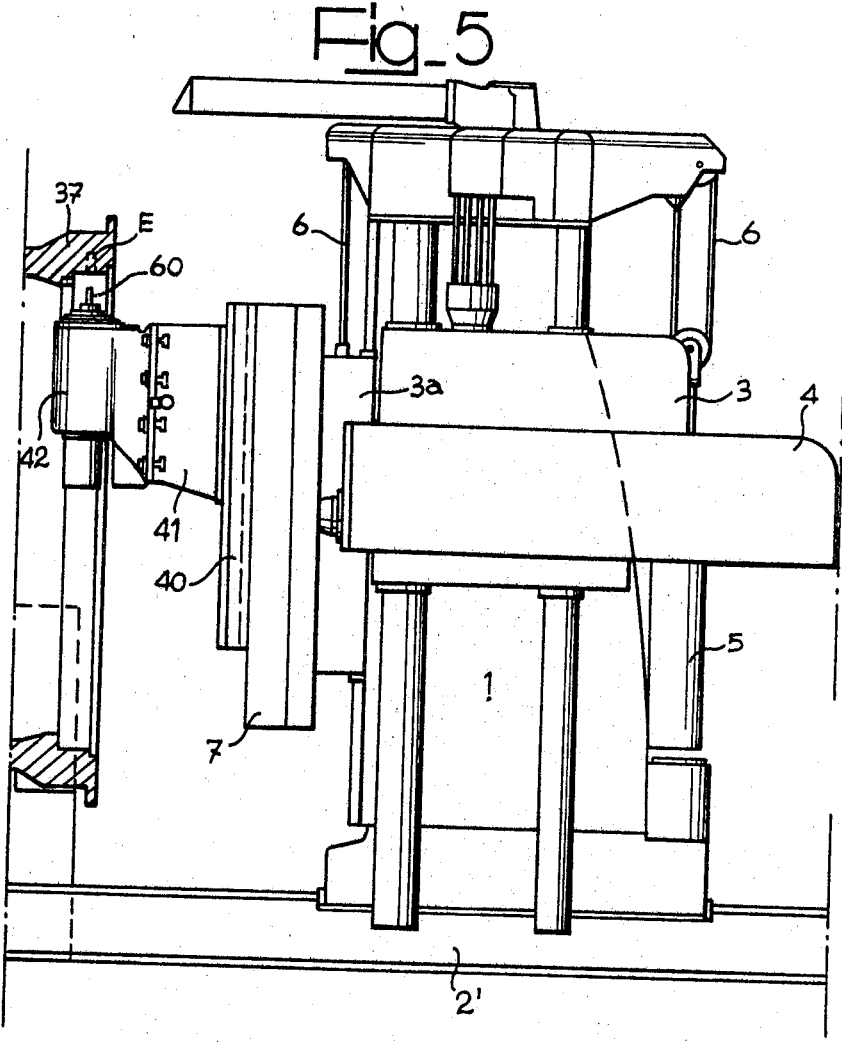

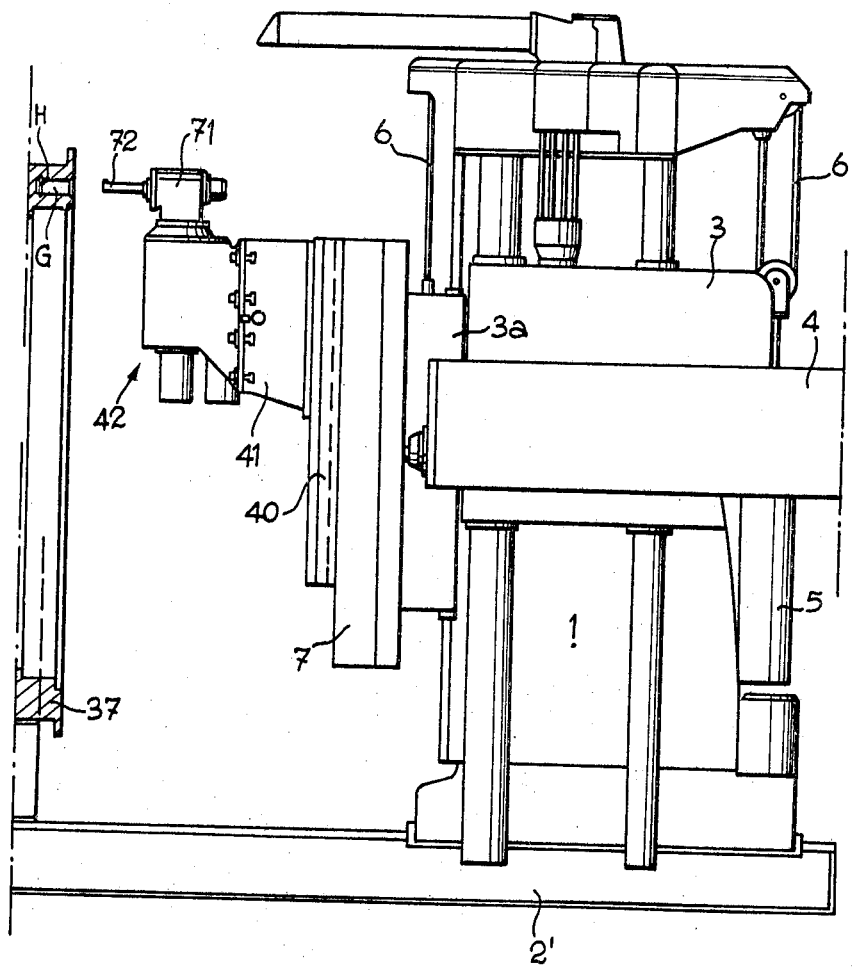

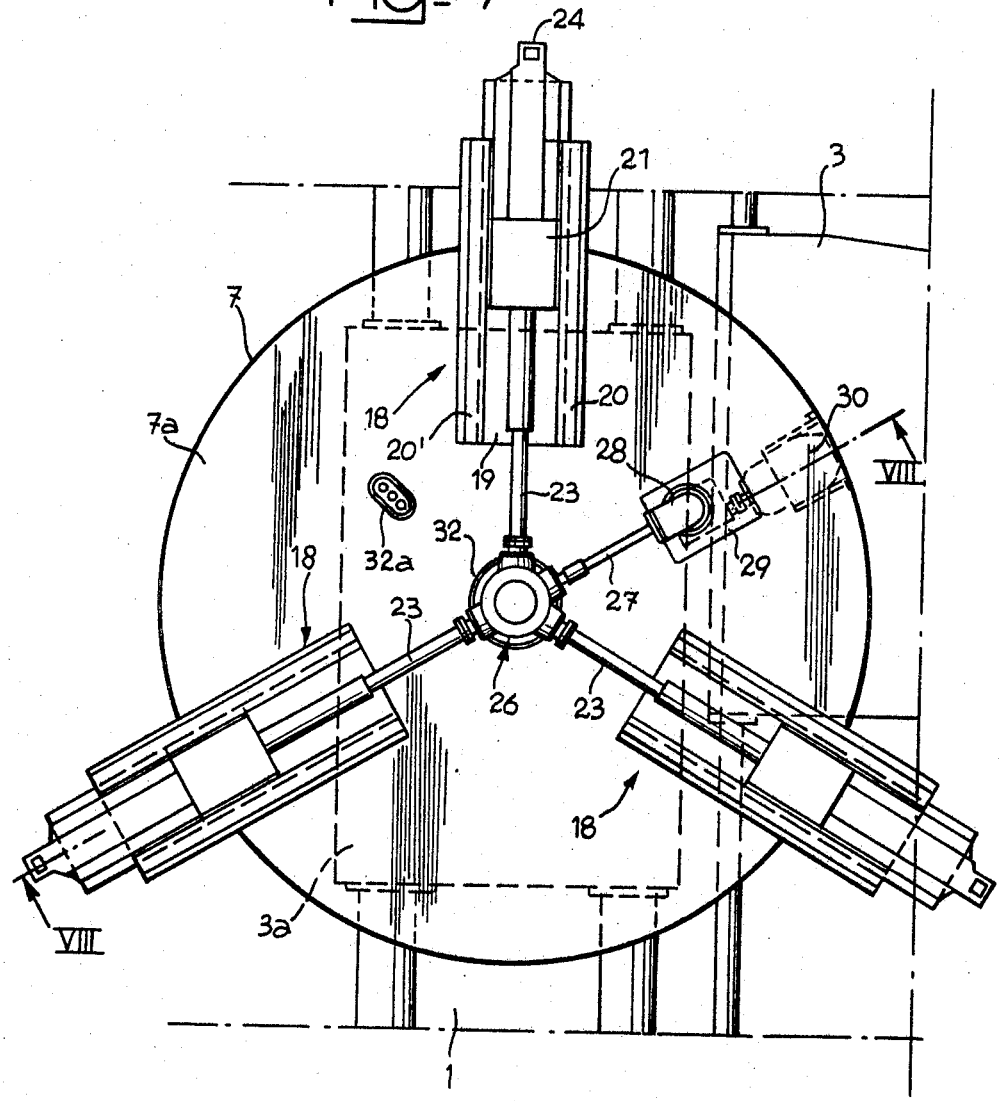

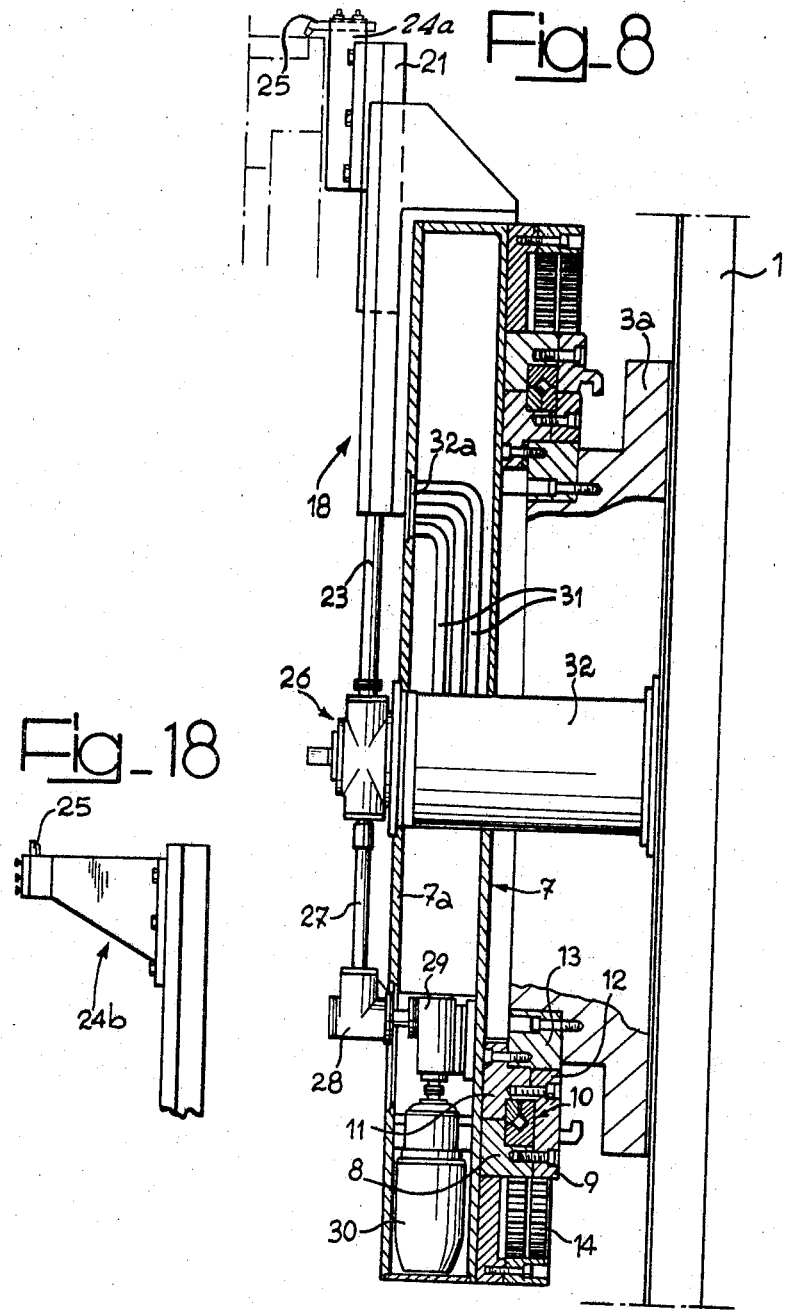

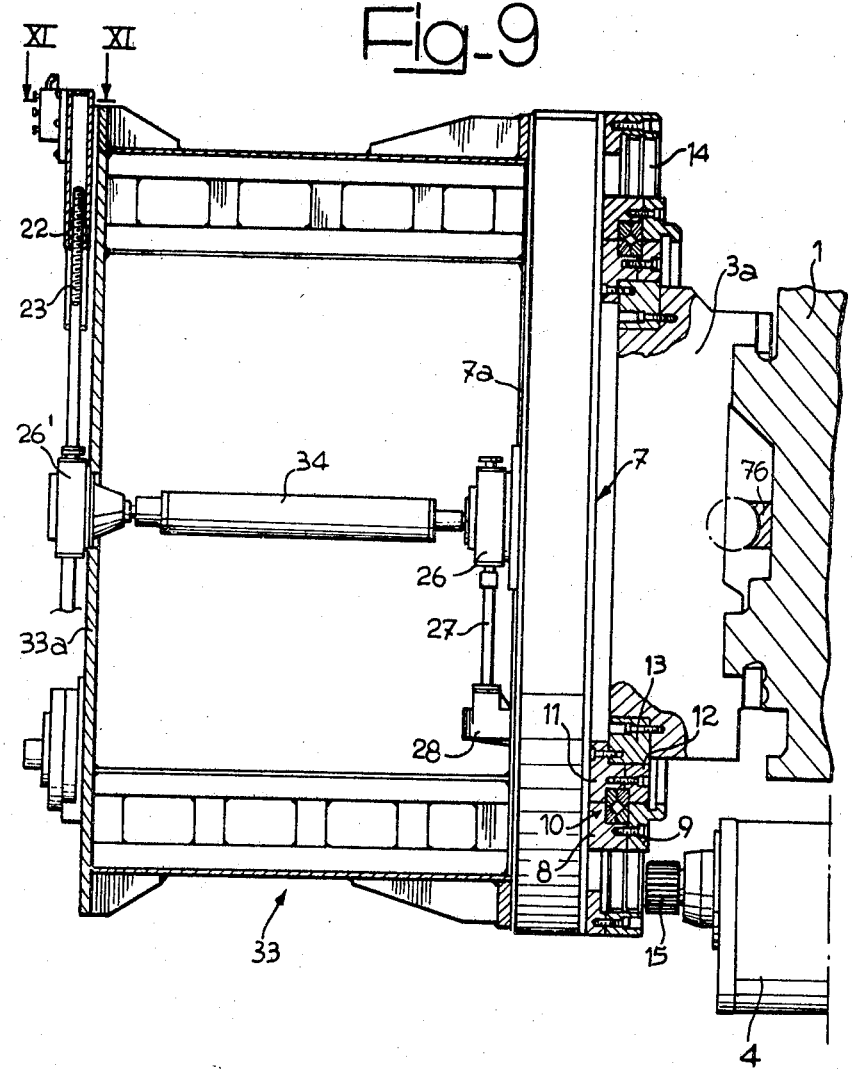

Dec. 9, 1969  M. GALBARINI ET AL  3,482,474
DEVICE FOR USE WITH A HORIZONTAL BORING-MILLING
MACHINE, PARTICULARLY WHEN MACHINING
LARGE SIZE WORKPIECES
Filed July 31, 1967  15 Sheets-Sheet 10
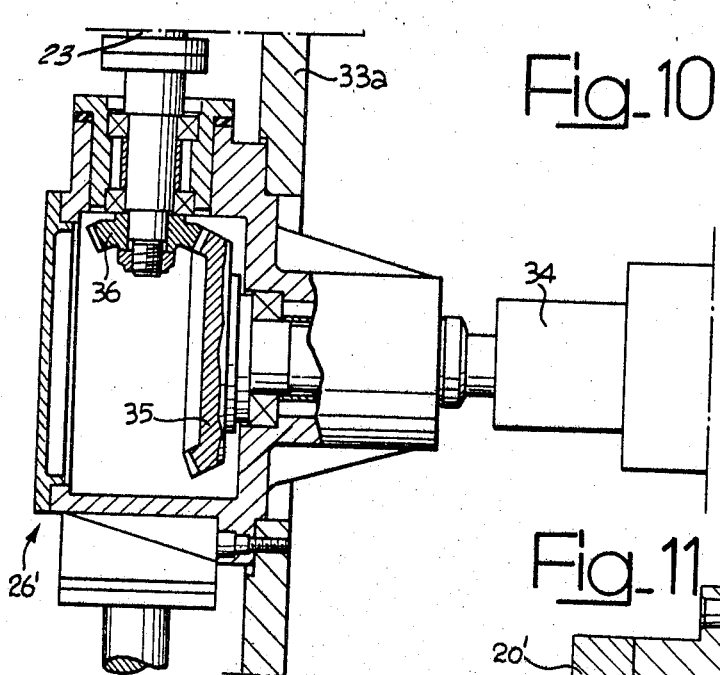
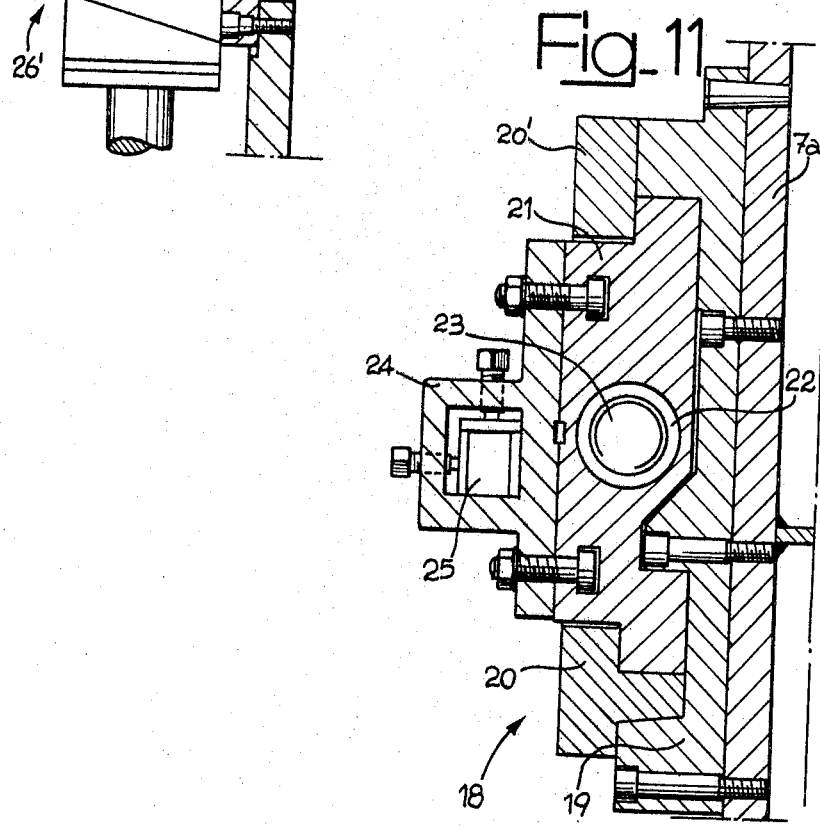

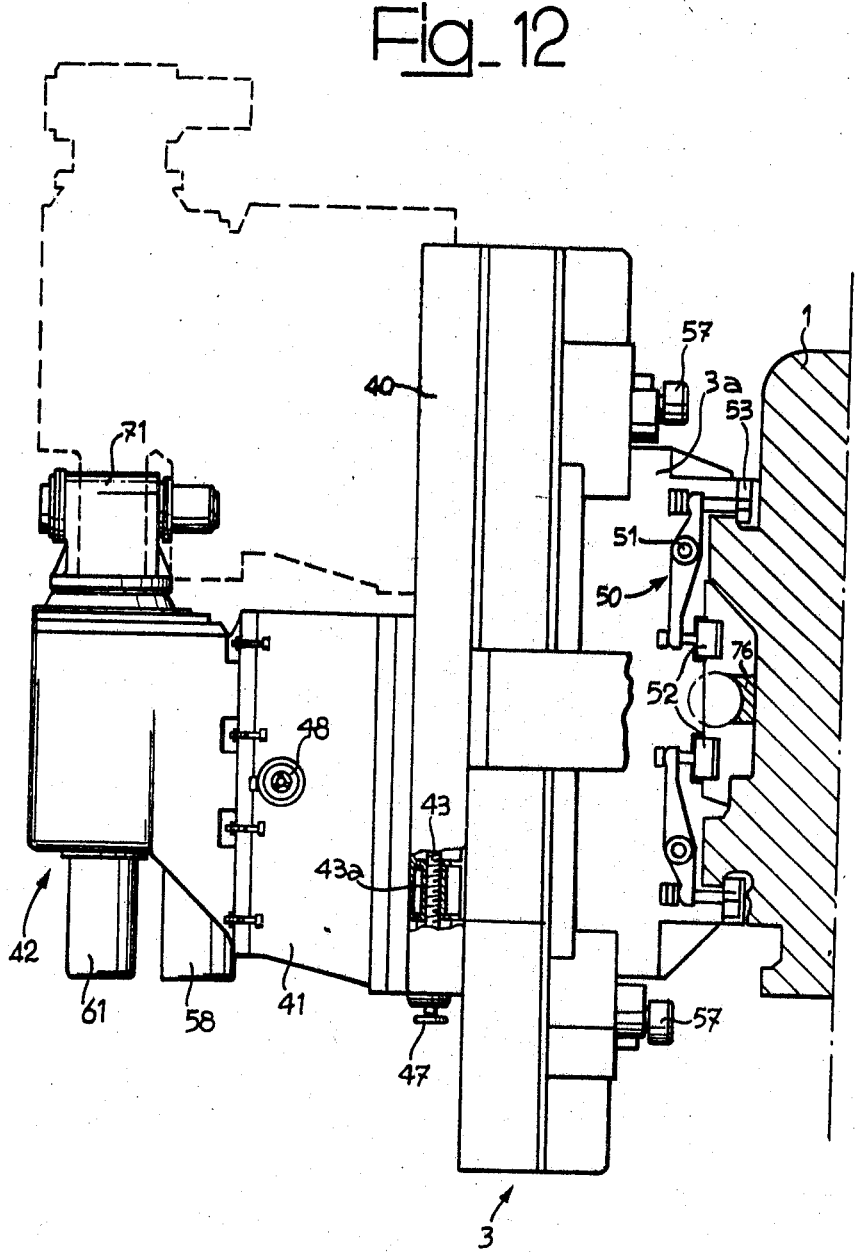

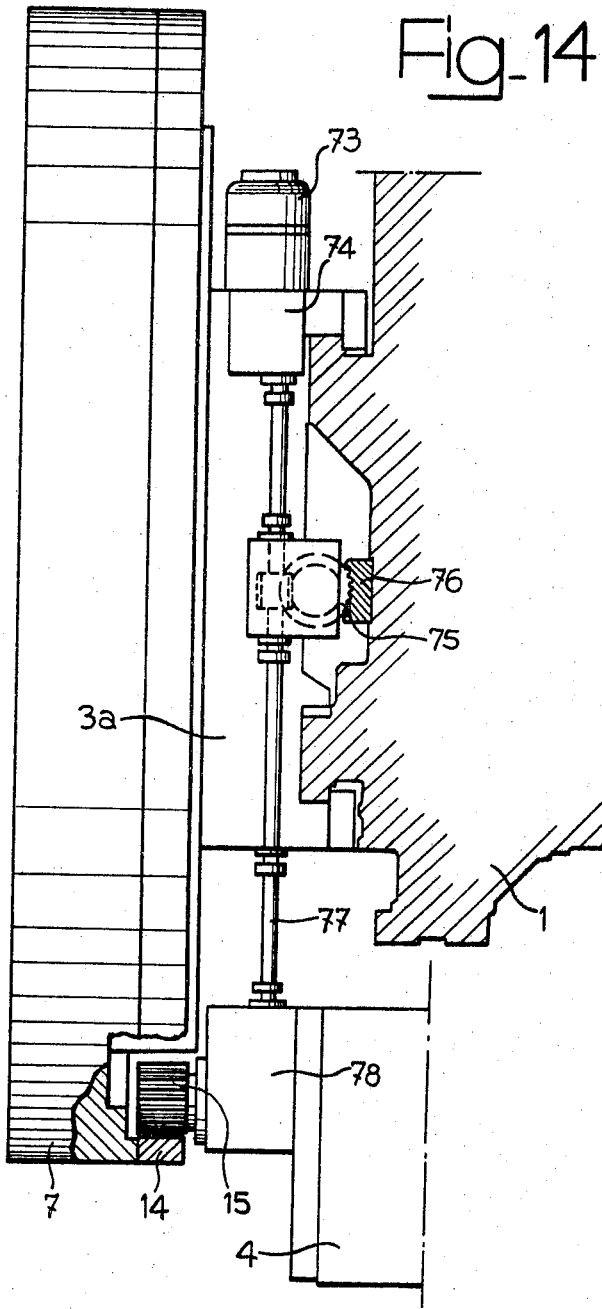

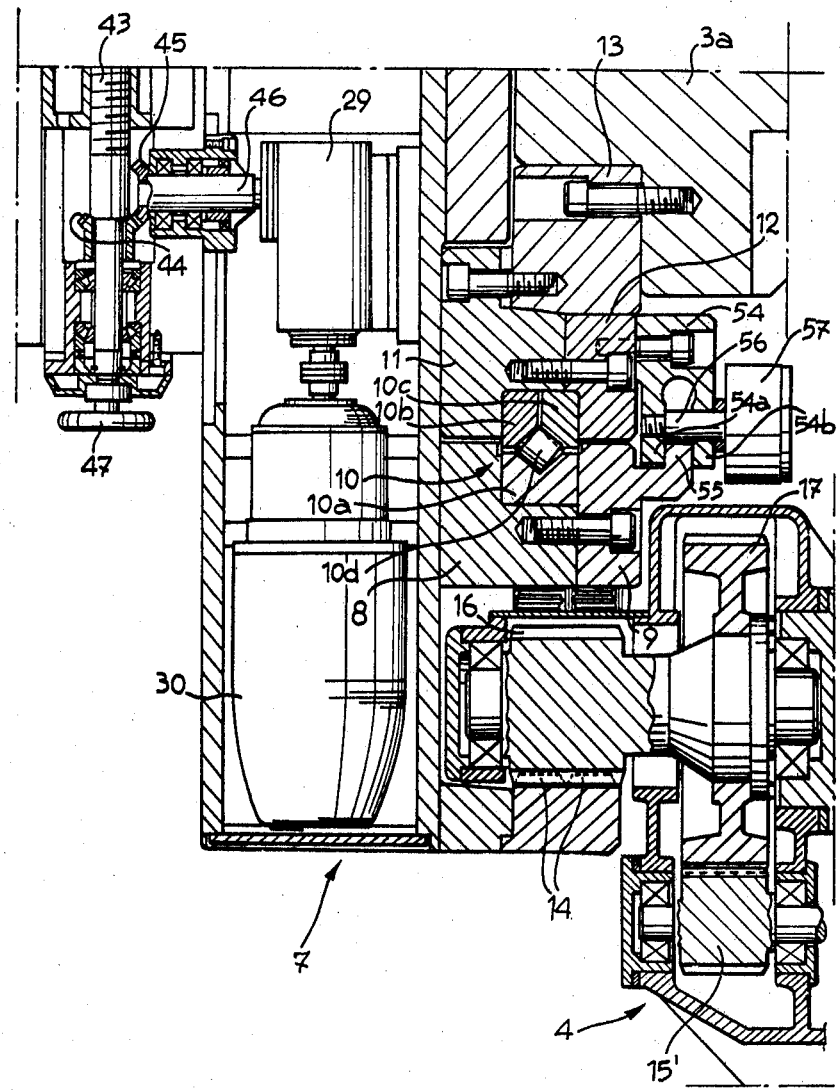

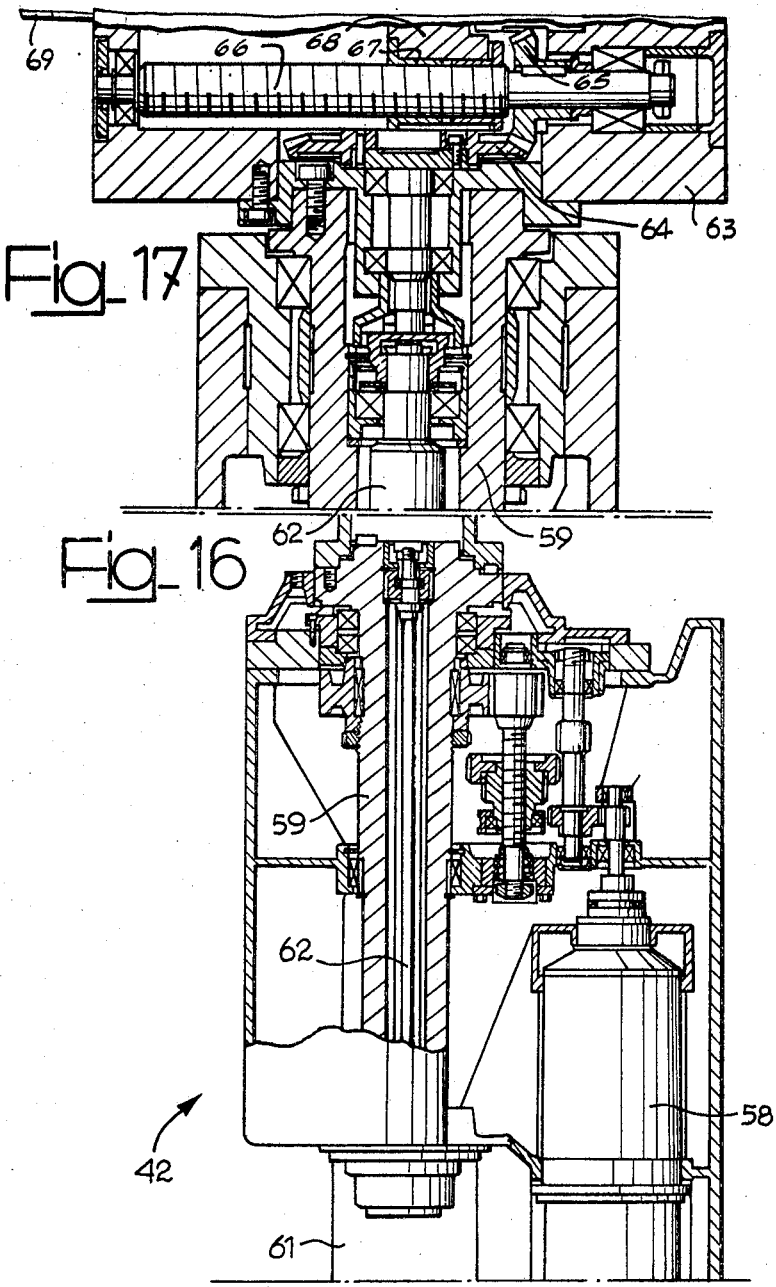

United States Patent Office 3,482,474
Patented Dec. 9, 1969

3,482,474
DEVICE FOR USE WITH A HORIZONTAL BORING-MILLING MACHINE, PARTICULARLY WHEN MACHINING LARGE SIZE WORKPIECES
Maso Galbarini and Francesco Cotta Ramusino, Milan, Italy, assignors to Innocenti Societa Generale per l'Industria Metallurgica e Meccanica, Milan, Italy
Filed July 31, 1967, Ser. No. 657,103
Claims priority, application Italy, Mar. 24, 1967, 51,050/67
Int. Cl. B23b 39/16, 47/30; B23c 7/00
U.S. Cl. 77—3                                    24 Claims

ABSTRACT OF THE DISCLOSURE

In a boring-milling machine, the machine standard is provided with front guides for an auxiliary slide carrying rotatably mounted thereon a platform which supports at least one adjustable tool holder or heads carrying motor driven tools. A cantilevered extension is mounted on the face of the platform and is capable of mounting via axial or radial extensions tool holders or heads.

---

The invention relates to a device which is intended for use with a horizontal boring-milling machine, particularly when a workpiece of large size is to be machined. It is known to slidably mount an auxiliary slide on the front guides of the machine standard and to rotatably mount on the said auxiliary slide a platform which supports at least one adjustable tool holder. In accordance with the present invention tools may be either mounted directly on the forward face of the said platform or may be mounted on the forward face of an extension thereof. In either case provision is made for radial adjustment of the said tools with respect to the said forward face. Provision is also made for the mounting of the tools on the said forward face via axial or radial extensions. In accordance with the invention there may, if desired, be utilised on the forward face of either the rotary platform or the extension thereof, an auxiliary head which head is slidable with respect to the said forward face under the control of a motor. The said auxiliary head carries a motor whereby tools also carried by the said auxiliary head may be power driven. If desired, the tools may be carried on extensions of the said auxiliary head which extensions are themselves slidable under the control of a further motor. As a further possible alternative, such an auxiliary head may be eccentrically mounted for special machining purposes or may even itself be provided with an angle head for other special machining purposes.

The invention relates to a device for use with a horizontal boring-milling machine of the type which may be defined as comprising a vertical standard which is movable along horizontal guides secured to a floor or other supporting surface, a spindle stock slide being mounted on the said standard for vertical displacement with respect thereto and a spindle stock being mounted on the slide for horizontal displacement with respect thereto. Such a device is particularly useful when large size workpieces are to be machined.

For facing and boring large size workpieces it is known, through the disclosures of U.S. Patent No. 3,251,272, to fit an auxiliary slide to the forward standard guides, which auxiliary slide is independent of the spindle stock slide and has mounted thereon a platform which is rotatable about a horizontal axis. This platform supports at least one adjustable tool holder, the desired machining being effected by rotation of this platform.

With such an arrangement large diameter facing and large diameter boring can be carried out, but unfortunately the results can only be of limited depth. When machining large sized mechanical parts, however, it is sometimes necessary to work at a substantial depth and possibly to drill, bore, spot-face, tap and/or mill in a radial direction with respect to the major axis of the workpiece.

It is therefore an object of the present invention to prvoide a device for use with a machine tool generally of the above defined type, which will permit the machining of large workpieces in the abovementioned manner and the sequential performance of all operations required for completion of a workpiece, without displacement of the latter from its original arrangement and disposition.

A further object of the invention is to provide a device of the abovementioned type which is simple and tough in construction, which enables all types of machining normally possible with boring and milling tools to be extremely accurately carried out at least substantially irrespective of the size of the workpiece.

According to these and other objects, the present invention consists in a device for use with a horizontal boring-milling machine of the type generally defined herein, particularly when machining large size workpieces, the device comprising a circular platform of large diameter adapted to be rotatably mounted on an auxiliary slide which is vertically slidable on the forward guides of the machine standard independently of the spindle stock slide thereof, the circular platform being connectable to driving means provided on the machine e.g. on the machine auxiliary slide for the vertical displacement thereof, to receive therefrom a rotary working and an angular positioning movement. There may be fitted to the said platform via suitable attachment means either radially arranged tool holder sets or an auxiliary head, the latter being used generally for milling and boring and the former generally for boring and facing. Also in accordance with the invention the said platform incorporates means for effecting either the simultaneous radial displacement of the said too holder sets of the radial displacement of such an auxiliary head when fitted instead of the said tool holder sets, means being also provided for supplying electric current to the said radial displacement means tool drive or tool positioning means for the said auxiliary slide and any further accessory circuits requiring electric current. The said tool holder sets and the said auxiliary head are attachable to the rotary platform either directly to its forward or outer face or indirectly through the interposition of a tubular extension which is itself adapted to be secured to the said forward or outer race of the platform. Such a platform is itself provided at its forward or outer face with attachment means for the fitting thereto of the abovementioned tool holders or auxiliary slide and the means for effecting their radial displacements. Means are also provided in accordance with the invention for angularly locking the platform at a chosen position with respect to the auxiliary slide.

The tool sets referred to above may carry tools either directly or via the interposition of axial or radial extensions. Similarly, tools may be carried on a said auxiliary head either directly or with the interposition of an extension.

If desired, the auxiliary head may be eccentrically mounted with respect to the said platform or may itself carry an angle head. Either of the two last-mentioned possibilities are usfeul for special machining purposes.

These and other objects and advantages of the invention will be clear from the following description, given with reference to the accompanying drawings which are by way of example and in which:

FIGS. 1 to 6 inclusive are general elevational side views of a boring-milling machine provided with a device according to the invention for the purpose of carrying out various machining steps, if necessary at substantial depths, on large size workpieces, the devices illustrated and the detail of their illustration varying slightly through the said six figures;

More specifically, the device of FIG. 1 is shown in use for facing, the device of FIG. 2 for deep boring, the device of FIG. 3 for radial boring, the device of FIG. 4 for spot facing along radial axes, the device of FIG. 5 for forming radial slots or holes and the device of FIG. 6 for drilling holes, boring, tapping or milling along longitudinal axes.

Furthermore, FIG. 7 is an elevational front view of a device according to the invention fitted to a machine for boring or facing;

FIG. 8 is a sectional view taken along line VIII—VIII of FIG. 7;

FIG. 9 is an axial sectional view of a device modified by the provision thereon of a tubular extension;

FIG. 10 is an axial sectional view showing, on an enlarged scale, a detail of FIG. 9;

FIG. 11 is a cross sectional view on an enlarged scale taken along line XI—XI of FIG. 9;

FIG. 12 is a plan view of a device according to the invention when provided with an auxiliary spindle stock for milling and boring;

FIG. 14 is a sectional view from above of a part of a device according to the invention showing means both for effecting vertical movements of the auxiliary slide and effecting rotary or angular displacement of the rotary platform;

FIG. 15 is a sectional view taken along line XV—XV of FIG. 13;

FIG. 16 is a detailed axial sectional view of the auxiliary spindle stock shown in FIG. 12;

FIG. 17 is an axial sectional view of an expanding head used for boring which is adapted to be fitted to such an auxiliary spindle stock; and FIG. 18 is a side elevational view of an extension tool holder.

Figure 13:
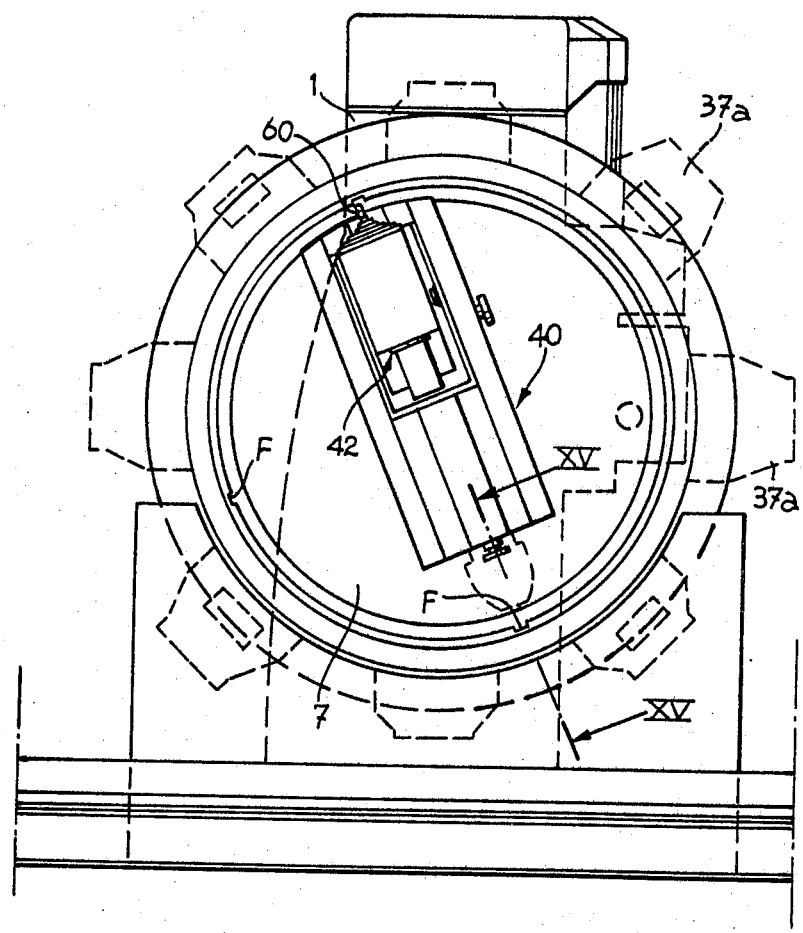
FIG. 13 is a front view of the device shown in FIG. 12.

In FIGS. 1 to 6, there are diagrammatically illustrated examples of the various types of machining which can be carried out with a horizontal boring-milling machine and a device according to the invention. In this way the normal working capacity and flexibility of such a horizontal boring-milling machine may be considerably increased.

As shown, such a machine normally comprises a vertical standard 1 which is arranged to be slidable along horizontal guides 2, 2′, these guides being laid on a floor or other supporting surface. A spindle stock slide 3 is mounted for vertical displacement up and down the standard 1, a spindle stock 4 being horizontally displaceable with respect to the said slide 3.

An auxiliary slide 3a is slidably mounted, independently of the stock slide 3, on the forward guides for the standard 1 (i.e. the guides directed towards the working front) and is provided with its own feed means of conventional type. The auxiliary slide 3a is shown connected to a counterweight 5 (see particularly the detailed view thereof in FIG. 4) by means of ropes 6 which are reversed over pulleys, but alternatively, it may be provided with a fluid pressure balancing device (not shown). In either case, however, the considerable weights of the auxiliary appliances which are to be supported by the said auxiliary slide 3a are balanced.

A device according to the present invention, which may advantageously be used in connection with a machine of the above-mentioned type, comprises a rotary platform 7 which is mounted as shown in FIGS. 8 and 15, via a crossed roller bearing 10, on the auxiliary slide 3a. As is also shown in the said figures, the rotary platform 7 is assembled on the slide 3a by means of a plurality of annular elements 11, 12, 13, separately attached to the said slide, two of which elements 11, 12 are coupled by means of the abovementioned bearing 10 to two further annular elements 8, 9 which are fast with the rotary platform 7.

The bearing 10 comprises (see FIG. 15) a race ring 10a which is carried by the rotatable parts and two race rings 10b, 10c which are carried by the stationary parts. Crossed cylindrical rollers 10d are arranged between the three said race rings and impart to the rotary platform 7 a satisfactory stability, notwithstanding its size and weight.

As shown in FIG. 14, the means for effecting vertical displacements of the auxiliary slide 3a on the standard 1 comprises an electric motor 73 which is carried by the said slide 3a and operates a worm screw 75 via a reducing gear 74, the screw 75 meshing with a rack 76 which is secured to the standard 1. The slide 3a may conveniently be locked in a desired position by the action of a plurality of rocker levers 50 (see FIG. 12) which are articulated to pivots 51 and so operable at one of their ends by fluid pressure cylinders 52 as to act, by their opposite ends, on staybolts connected to lock strips 53.

As also shown in FIG. 14, the rotary platform 7 has externally secured thereto an internally toothed rim 14 which is adapted to cooperate either directly (see FIGS. 9 and 14) with a pinion 15 carried by the spindle stock 4 or (see FIG. 15) with a reducing gear arrangement 16, 17, operable by a pinion 15′ which is carried by the said spindle stock 4. More specifically, in the former case a rotary working or positioning movement is transmitted to the platform 7 by means of the pinion 15 which is operable by the same arrangement 73, 74, 75 that effects the vertical movements of the auxiliary slide 3a. As is shown in FIG. 14, in such a case the aforementioned arrangement 73, 74, 75 is connected to a gearbox 78 via a drive 77. The box 78 is situated at the forward end of the spindle slide 4 and receives its working movement therefrom. The manner of transmission of such a rotary movement to the platform 7 by the arrangement 15′, 16, 17 will be self-evident from a study of FIG. 15.

The forward face 7a of the rotary platform 7 is provided with attachment means, generally in the form of T-shaped grooves, whereby a plurality of tool holders sets 18 may be fitted to the said platform. In practice two or three such sets are radially arranged so as to provide a correct balance (see FIGS. 7 and 8).

As shown generally in FIGS. 7, 8, 9 and 10 and in detail in FIG. 11, each tool holder set 18 comprises a bedplate 19 which is secured directly to the outer face 7a of the rotary platform 7 and is provided with T-shaped guides 20, 20′ which permit the guided displacement therebetween without play of a movable slide 21. Such movement is under the control of positioning means which comprise a nut 22 fast with the slide and is cooperation with a driving worm screw 23. A tool holder case 24 is fitted to each slide 21 and each such case 24 can be provided as desired with one or more working tools 25. If desired, and as shown in FIG. 8, the working tools may even be carried by radial extensions 24a in order to enlarge the effective working diameter, or, as shown in FIG. 18 and for special purposes, by axial extensions 24b. FIGS. 7 and 8 illustrate how the various slides 21 for the tool holder sets 18 are movable, via respective said screws 23, by a single electric motor 30 which is carried on the rotatable platform 7 and which drives an eccentric head 28, a shaft 27, and central take-off box 26 through a reducing gear 29. The take-off box 26 is operatively connected with the various screws 23, and the motor 30, which is a direct current motor, is conveniently fed by means of a suitable central commutator arrangement 32.

Tool holder sets arranged as described may be employed for boring or facing large size workpieces, for instance the part 37 shown in FIGS. 1 and 2. Such a workpiece 37 is mounted on supports 38, 38′ which are respectively movable along longitudinal guides 39 (see FIG. 1) or along transverse guides 39′ (see FIG. 2). In FIG. 1, A denotes a portion of a faced forward surface of the workpiece 37 being machined by tools carried by the platform 7.

In order to effect deep boring on the internal surfaces B of FIG. 2, the rotary platform 7 is conveniently provided, as shown in the said FIG. 2 and also in FIGS. 9 and 10, with a tubular extension 33 of suitable length, which carries means for attaching the tool holder sets 18 to its outer face 33a. This outer face 33a of the extension 33 is provided with a central power take-off box 26' which is operatively connected to the corresponding and aforementioned central box 26 of the platform 7, such connection being by a telescopic shaft 34.

As shown in detail in FIG. 10 with particular reference to box 26', but with general reference to both boxes 26, 26', each said box houses a conical toothed rim 35 which is adapted simultaneously to act on a plurality of bevel pinions 36 keyed each to the end of a said driving screw 23. In this way all the tool holder slides can be simultaneously radially moved either during work or prior to the commencement of work.

The forward surface 7a of the rotary platform 7 or the forward surface 33a of the tubular extension 33 thereof, can be provided, instead of with the tool holder sets 18, with an auxiliary head 42 for use in carrying out milling and boring. This head is securely supported by a base 41 which is slidably mounted in a fixed base 40 adapted to be fitted to a said forward surface. Such an arrangement is shown in FIGS. 12, 13 and 15 and as will be seen therefrom the slidable base 41 of the auxiliary head 42 is formed integrally with a part which is slidably mounted in the fixed base 40 and arranged to be driven by a worm screw 43 which cooperates with a stationary nut 43a. As best shown in the more detailed FIG. 15, the screw is driven, through a set of bevel gears 44, 45 and a longitudinal shaft 46, either from the eccentric power take-off previously referred to or, as shown, from a reducing gear 29 which is itself driven from the electric motor 30. Either arrangement is suitable for effecting radial positioning of the auxiliary head and boring or facing tools.

As shown in FIG. 16 such an auxiliary head 42 includes a main motor 58 which is adapted to drive, through a suitable gearbox, a tool holder spindle 59 to which a tool 60 may be directly secured. Such a tool is for instance suitable for drilling holes (as at E in FIG. 5) or for radially milling (as at F in FIG. 13). Alternatively, and as shown in FIGS. 4 and 17, the auxiliary head 42 may have secured thereto an extension 70 adapted either directly to carry a tool 69 for radial machining or a radially extending tool holder 63, which comprises a slider 68 fast with a said tool. The slider 68 is movable in longitudinal guides which are carried by the head 63 and is connected to a nut 67 which cooperates with a worm screw 66 driven, via a pair of bevel pinions 65, 64, from a shaft 62. This shaft is coaxially arranged within the spindle 59 and is driven from a further electric motor 61 carried by the head 42 in the manner shown in FIGS. 3 and 16. Such an arrangement can be employed either for radially boring cylindrical surfaces C in protrusions 37a of the workpiece 37, as shown in FIG. 3, or for external spot facing at D as shown in FIG. 4. In the latter case special extensions 69a are fitted to the tool 69.

In accordance with a further modification and as shown in FIGS. 6 and 12 the auxiliary head 42 may be equipped with a further angle head 71 which is adapted to carry face machining tools 72 for frontally drilling holes or tapping and spot facing at G and H. As a still further alternative, the auxiliary head 42 may be eccentrically positioned with respect to the rotational axis of the platform 7 in order that special work may be carried out.

The motors 58, 61 of the auxiliary head are supplied with electric current through an auxiliary plug and socket connection 32a (see FIGS. 7 and 8) which is situated on the rotary platform 7 and is connected by means 31 to the central commutator 32. This commutator 32 may be further utilized for supplying current to various accessory circuits, for instance drive, safety, limit, visualizing or similar circuits.

In use and to machine with the auxiliary head 42, the rotary platform 7 is locked in a selected angular position with respect to the auxiliary slide 3a. To this end the platform 7 may be provided with a stop and lock device of the type shown in FIG. 15, which device comprises an auxiliary element 54 fitted to the stationary annular element 12 which carries the bearing 10. This element 54 has two resiliently deformable spaced lips 54a, 54b which are adapted to engage a continuous annular projection 55 formed on the annulus 9 which is fast with the rotatable platform 7. The two resilient lips 54a, 54b are biased into their closed position wherein they lock the platform 7 against rotation, with respect to the auxiliary slide 3a, such biasing being by means of a plurality of fluid pressure cylinders 57 which act on the said lips by means of a staybolt 56.

If desired, ultimate or fine positioning of the platform 7 can be effected by hand by means of the driving and control devices shown in FIG. 14. Alternatively, control of the position of the rotary platform 7 may be effected by means of highly accurate check devices known per se. The slidable base 41 which carries the auxiliary head 42 may even be moved manually by means of a hand wheel 47 and held in the position it has reached by means of a further stop hand wheel 48, these integers being shown in FIGS. 12 and 15.

As a result of the various constructions possible for a device according to the invention, a wide range of machining is possible. In practice the steps necessary for finishing a large size workpiece can be carried out without its displacement from an initial position in which it has been clamped. This ensures the greatest possible accuracy in machining.

Various modifications of the present invention are of course possible within the scope of the appended claims.

What we claim is:

1. A device for use with a horizontal boring-milling machine, particularly for machining large workpieces, the device comprising a circular platform of large diameter and an auxiliary slide, the auxiliary slide being vertically slidable on the forward guides of the machine standard independently of spindle stock slide thereof and the circular platform being adapted to be rotatably mounted on the auxiliary slide and connectable to driving means provided on the machine thereby to receive therefrom a rotary working and an angular positioning movement, crossed cylindrical roller bearing means consisting of three race rings to support the rotatable platform, tool holding means being provided which are attachable to the platform and radial displacement means provided whereby the tool holding means may be radially displaced with respect to the platform, and a cantilevered extension means whereby the tool holding means may be axially displaced from the forward face of the platform.

2. Device as claimed in claim 1, wherein the radial displacement means incorporate electric motors which are supplied with electric current by supply means incorporated in the platform.

3. Device as claimed in claim 1, wherein the extension is a tubular extension adapted to be secured to the forward or outer face of the platform and to carry the tool holding means on its forward or outer face.

4. Device as claimed in claim 1, wherein the tool holding means are in the form of tool holder sets which are radially arranged with respect to the platform rotary axis and which carry tools used generally for boring and facing, the displacement means effecting the simultaneous radial displacement of the tool holder sets.

5. Device as claimed in claim 4, wherein tools are carried by the tool holder sets through the interposition of axial extensions.

6. Device as claimed in claim 4, wherein tools are carried by the tool holder sets through the interposition of radial extensions.

7. Device as claimed in claim 1, wherein the tool holding means comprises an auxiliary head which is used generally for milling and boring and which is radially displaceable with respect to the platform axis by the displacement means, the auxiliary head being provided with tool drive motor means.

8. Device as claimed in claim 7, wherein the auxiliary head is provided also with two positioning means whereby the tool carried thereby may be positioned with respect to the auxiliary head on an extension thereof.

9. Device as claimed in claim 7, wherein the auxiliary head carries a further angle head.

10. Device as claimed in claim 7, wherein the auxiliary head is eccentrically mounted with respect to the platform.

11. Device as claimed in claim 1, wherein the radial displacement means carried by the platform for radially displacing the tool holder means includes an electric motor adapted to drive an eccentric power take-off through a reducing gear, the take-off being connectable with a worm screw and a central power take-off, the worm screw and power take-off being connectable with the tool holding means.

12. Device as claimed in claim 11, wherein the tool holding means are in the form of tool holder sets and the sets are connectable with the central power take-off.

13. Device as claimed in claim 11, wherein the tool holding means comprise an auxiliary head, which auxiliary head is connected with the worm screw.

14. Device as claimed in claim 1, wherein the radial displacement means and tool holding means are carried at the forward and outer face of the extension and the radial displacement means include a central power take-off which is connectable with driving screws and is adapted to be driven by a central power take-off carried by the rotary platform, such connection being through an intermediate shaft.

15. Device as claimed in claim 14, wherein the tool holding means comprise tool holder sets connected to the driving screws.

16. Device as claimed in claim 14, wherein the tool holding means comprise an auxiliary head having a driving screw connectable with an eccentric power take-off adapted to be driven from a corresponding eccentric power take-off mounted on the platform, such connection being through an intermediate shaft.

17. Device as claimed in claim 1, wherein the means for supplying electric current to the various motors and displacement means comprises a central electric commutator connected by leads to at least one lateral electric plug for feeding the motors and means.

18. Device as claimed in claim 1, wherein the platform is provided with an inner toothed rim which meshes directly with a pinion driven from the spindle stock of the machine tool thereby to transmit to the platform a rotary motion.

19. Device as claimed in claim 18, wherein the toothed rim meshes with the pinion carried by the spindle stock and operated by the means which effect vertical movement of the slide.

20. Device as claimed in claim 1, wherein the rotary platform is provided with an inner toothed rim which meshes indirectly their intermediate gears with a pinion driven from the spindle stock of the machine tool thereby to transmit to the platform a rotary working motion.

21. Device as claimed in claim 20, wherein the toothed rim meshes with the pinion carried by the spindle stock and operated by the means which effect vertical movement of the slide.

22. Device as claimed in claim 21, wherein the tool holding means are in the form of tool holder sets each of which sets include a slide movable in a separately attached base provided with T-shaped guides, each of the slides carrying a tool.

23. A device as in claim 1, wherein locking means consisting of a plurality of pivoted rocker levers hydraulically operable are provided to lock the auxiliary slide at the chosen position.

24. A device as claimed in claim 1, further comprising a means for locking the rotary platform comprising an annular extension carried by the platform and a stationary clamping member having two resiliently deformable lips, the annular extension adapted to be engaged between the two lips.

References Cited

UNITED STATES PATENTS

| | | | |
|---|---|---|---|
| 2,786,395 | 3/1957 | McFerren et al. | 90—11.1 |
| 3,136,563 | 6/1964 | Swanson et al. | 90—11.1 |
| 3,152,394 | 10/1964 | Miller et al. | 77—3 |
| 3,237,487 | 3/1966 | Widmer et al. | 77—3 |
| 3,251,272 | 5/1966 | Deflandre | 90—11 |
| 3,290,965 | 12/1966 | Gaev et al. | 77—3 |

GERALD A. DOST, Primary Examiner

U.S. Cl. X.R.

77—1; 90—11, 15